(12) United States Patent
Forman

(10) Patent No.: US 12,367,327 B2
(45) Date of Patent: Jul. 22, 2025

(54) SYSTEM AND A METHOD FOR CORRECTING INFLATED COMPUTED RISK ESTIMATES BY EMPLOYING MONTE CARLO SIMULATIONS

(71) Applicant: Ernest Forman, Boynton Beach, FL (US)

(72) Inventor: Ernest Forman, Boynton Beach, FL (US)

( * ) Notice: Subject to any disclaimer, the term of this patent is extended or adjusted under 35 U.S.C. 154(b) by 0 days.

(21) Appl. No.: 17/883,026

(22) Filed: Aug. 8, 2022

(65) Prior Publication Data

US 2024/0320386 A1    Sep. 26, 2024

Related U.S. Application Data

(63) Continuation-in-part of application No. 16/803,191, filed on Feb. 27, 2020, now Pat. No. 11,436,545, which is a continuation-in-part of application No. 16/458,132, filed on Jun. 30, 2019, now abandoned, which is a continuation-in-part of application No. 14/032,467, filed on Sep. 20, 2013, now Pat. No. 10,360,524.

(60) Provisional application No. 61/826,324, filed on May 22, 2013.

(51) Int. Cl.
*G06F 17/00* (2019.01)
*G06F 30/20* (2020.01)
*G06F 111/08* (2020.01)

(52) U.S. Cl.
CPC .......... *G06F 30/20* (2020.01); *G06F 2111/08* (2020.01)

(58) Field of Classification Search
None
See application file for complete search history.

(56) References Cited

U.S. PATENT DOCUMENTS

| | | | | |
|---|---|---|---|---|
| 7,308,388 B2* | 12/2007 | Beverina | ............... | G06Q 50/26 703/2 |
| 7,319,971 B2* | 1/2008 | Abrahams | ............... | G06Q 40/08 705/7.29 |
| 7,610,257 B1* | 10/2009 | Abrahams | ............... | G06Q 40/03 706/62 |
| 7,778,897 B1* | 8/2010 | Rachev | .................. | G06Q 40/00 705/36 R |
| 2003/0149657 A1* | 8/2003 | Reynolds | ............... | G06Q 40/03 705/38 |

(Continued)

*Primary Examiner* — Sunit Pandya

(57) ABSTRACT

Disclosed is a system for correcting inflated computed estimates of event loses derived from computed likelihoods and impacts of the events. The system includes a processor, an input unit, a display unit, a Monte Carlo simulation trials to generate non-inflated estimates of event loses and a data storage. The processor is configured to receive computed values of likelihood of causes, receive computed values of likelihoods of the events given causes, receive consequence of the events on objectives, receive computed value of the objectives, apply the Monte Carlo simulation trials on the causes, the events given the causes, and consequences of the events on the objectives, and compute the average loss to the objectives and the chance that the loss will exceed a pre-defined percentage. The Monte Carlo Simulation trial results in determining the impact of the event by taking the sum product of the total loss to each objective and the computed value of the objectives.

6 Claims, 25 Drawing Sheets

(56) References Cited

U.S. PATENT DOCUMENTS

| | | | |
|---|---|---|---|
| 2004/0059592 A1* | 3/2004 | Yadav-Ranjan | G06Q 50/165 705/347 |
| 2006/0173762 A1* | 8/2006 | Clater | G06Q 40/00 705/35 |
| 2007/0016542 A1* | 1/2007 | Rosauer | G06Q 10/067 706/21 |

* cited by examiner

You have completed prioritizing the impact of the Objectives with respect to "Losses." Review your results below to ensure they make sense to you. If not, you may navigate back to the previous judgements to edit them.

Importance of "Losses"

| | Name | Participant Results | Graph Bar |
|---|---|---|---|
| 1 | Loss of life | 32.11 % | |
| 2 | Economic Costs | 14.64 % | |
| 3 | Loss of Confidence in Government | 2.56 % | |
| 4 | Decrease in Feeling of Security/ Increase of Fear | 4.71 % | |
| 5 | Loss of Confidence in the Financial Sector | 13.49 % | |
| 6 | Impairment to Social Services | 2.98 % | |
| 7 | Damage to the Environment | 4.56 % | |
| 8 | Loss of US Citizen Jobs | 17.39 % | |
| 9 | Increase of Consumer Fees/ Cost of Goods | 7.56 % | |

42

48 — Click here if you think the priorities are not reasonable

Next Unassessed
Previous | Next

Navigation Box
Steps: [1] ... [13] [14] [15] [16] [17] [18] [19] [20] [21] ... [33]  Evaluated: 31/31

FIG. 4C

| Create new scale | Edit existing scale(s) | | | |
|---|---|---|---|---|
| Measure Events With Respect To | Measurement Type | | Measurement Scale | Action |
| ▲ Impact | | | | |
| Loss of life | Rating Scale | ▷ | Default Likelihood Rating Scale ▷ | Copy Edit |
| Economic Costs | Rating Scale | ▷ | Default Impact Rating Scale ▷ | Copy Edit |
| Loss of Confidence in Government | Rating Scale | ▷ | Default Impact Rating Scale ▷ | Copy Edit |
| Decrease in Feeling of Security/ Increase of Fear | Rating Scale | ▷ | Default Impact Rating Scale ▷ | Copy Edit |
| Loss of Confidence in the Financial Sector | Rating Scale | ▷ | Default Impact Rating Scale ▷ | Copy Edit |
| Impairment to Social Services | Rating Scale | ▷ | Default Impact Rating Scale ▷ | Copy Edit |
| Damage to the Environment | Rating Scale | ▷ | Default Impact Rating Scale ▷ | Copy Edit |
| Loss of US Citizen Jobs | Rating Scale | ▷ | Default Impact Rating Scale ▷ | Copy Edit |
| Increase of Consumer Fees/ Cost of Goods | Rating Scale | ▷ | Default Likelihood Rating Scale ▷ | Copy Edit |

Pairwise Comparison
Rating Scale
Simple Utility Curve
Direct Priority Input
Step Function Ascending

FIG. 4D

You have completed providing your judgements. The Impact of the Events are shown below. — 404

Objectives Consequen... (100.0%)
- Loss of life (33.1%)
- Economic Costs (14.5%)
- Loss of Confidence in Gove... (2.6%)
- Decrease in Feeling of ... (4.7%)
- Loss of Confidence in the... (13.5%)
- Impairment to Social Servi... (3.0%)
- Damage to the Environment (4.5%)
- Loss of US Citizen Jobs (13.4%)
- Increase of Consumer Fees... (7.5%)

— 42

| No. | Event — 22 | Participant results | Impact |
|---|---|---|---|
| 1 | Terrorists Smuggle WMD into US and Commit a Violent Act | 58.37% | |
| 2 | Terrorists bomb stock exchange building | 33.07% | |
| 3 | Criminal Network Smuggles Illegal Drugs into US | 21.18% | |
| 4 | Criminal Network Smuggles Counterfeit Goods into the US | 20.51% | |
| 5 | Unauthorized Migrants Enter the US | 19.08% | |

These are the overall impacts of the Events. Please review them to see if they make sense to you. If not, you may have made a critical error. You can navigate back (using the Navigation Box) to review and edit your judgements.

Navigation Box
Steps: 1 ... 27 28 29 30 31 32 33 34 35 36 37   Evaluated: 37/37
— 406

Next Unassessed
Previous | Next

FIG. 4F

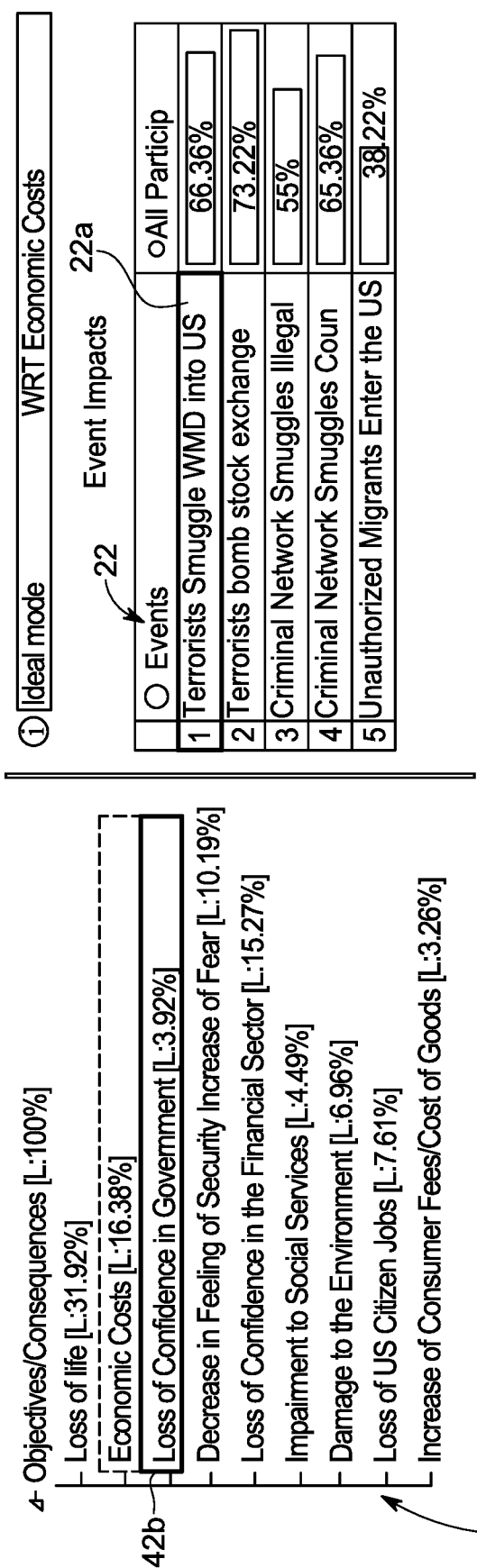
FIG. 4H(ii)

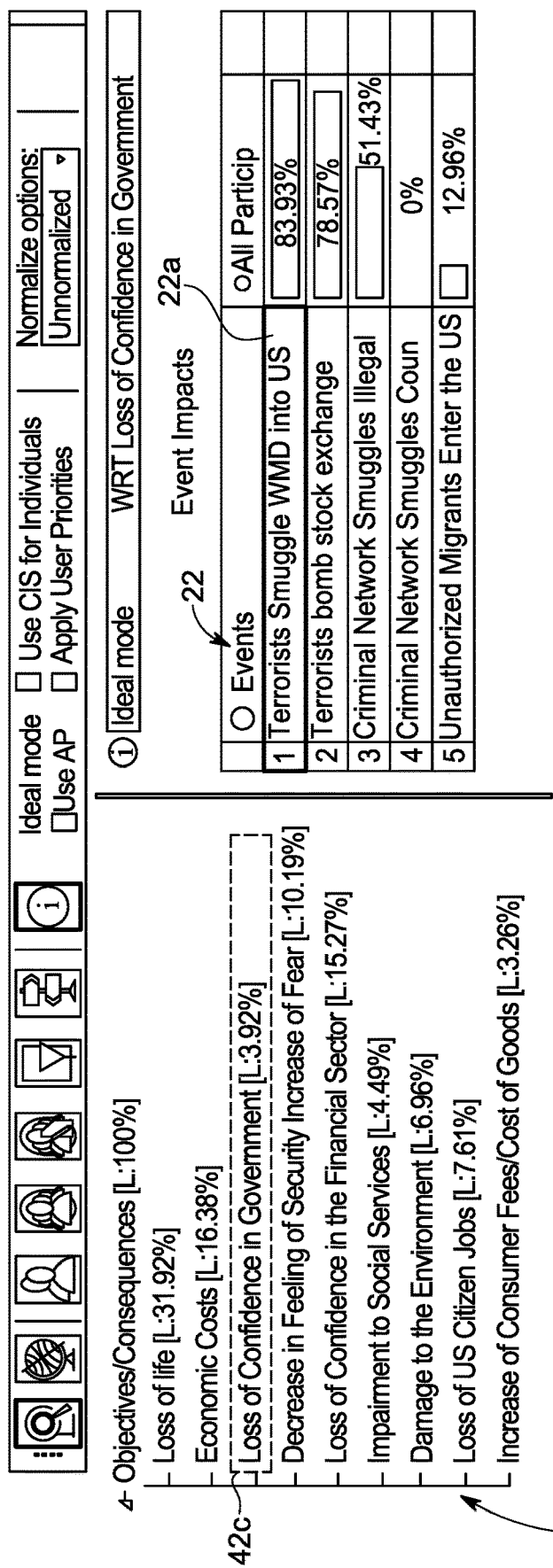
FIG. 4H(iii)

| Create new scale | Edit existing scale(s) | | | |
|---|---|---|---|---|
| Measure Events With Respect To | | Measurement Type | Measurement Scale | Action |
| ▲ Likelihood | | | | |
| Strengthening of Terrorists Cells | | Pairwise Comparison ▾ | | Copy |
| Lack of Intelligence Gathering and Sharing | | Pairwise Comparison | | Copy |
| Server Funding Pressures | | Rating Scale | | Copy |
| Ineffective Personnel Capacities | | Simple Utility Curve | | Copy |
| Inadequate Border Enforcement Technology | | Direct Priority Input | | Copy |
| Undeveloped Integrated Border Management Approach and Con | | Step Function Ascending | | Copy |
| Inadequate Harmonization with Foreign Jurisdictions | | Pairwise Comparison ▾ | | Copy |
| Lack of Political Will or Non-Partisanship to Address Issue | | Pairwise Comparison ▾ | | Copy |
| Strengthening of Organized Crime Groups | | Pairwise Comparison ▾ | | Copy |

| Impact | Likelihood | Risk | Controls | Controls Effectiveness | Controls Allocation |

> Structure >> Measure >> Synthesize >> Iterate >> Reports

Rate Event likelihoods given Lack of Inelegance Gathering and Sharing

⊞ Terrorists Smuggle WMD into US to Commi... ✎  ⊞ Lack of Intelligence Gathering and... ✎  ⊞ Terrorists Smugg... WRT Lack of Intellig... ✎

| Terrorists Smuggle WMD into US to Commit a Violent Act | Low ▾ | | | Terrorists Smuggle WMD into US to Commi... | |
|---|---|---|---|---|---|
| | | | | Intensity Name | Priority |
| Criminal Network Smuggles Illegal Drugs into US | Moderately ▾ | | 26% | ○ Not rated | 100% |
| | | | 47% | ○ Definitely | 86% |
| Criminal Network Smuggles Counterfeit Goods into the US | Moderately to consid ▾ | | 56% | ○ Highly likely | 69% |
| | | | | ○ Considerably | 56% |
| Unauthorized Migrants Enter the US | Highly likely ▾ | | 86% | ○ Moderate to considerably | 47% |
| | | | | ○ Moderately | 36% |
| | | | | ○ Low to moderately | 26% |
| | | | | ● Low | 4% |
| | | | | ○ Very low | 0% |
| | | | | ○ None | |
| | | | | ○ Direct Value | |

Navigation Box — Steps: 1 ... 15 16 17 18 19 20 21 22 23 ... 28  Evaluated: 20/50   Next Unassessed Previous | Next

FIG. 6E

You have completed prioritizing the priority of the Objectives

902 → Importance of "Objectives"

| No▲ | Name | Combined Impact of ... due to "Objectives" | |
|---|---|---|---|
| 1 | Financial | 7.22% | |
| 2 | Reliability, Availability, Maintainability | 21.70% | |
| 3 | Performance | 19.41% | |
| 4 | Human Factors | 10.64% | |
| 5 | Safety | 31.81% | |
| 6 | Public Relations | 9.21% | |

FIG. 9

SYSTEM AND A METHOD FOR CORRECTING INFLATED COMPUTED RISK ESTIMATES BY EMPLOYING MONTE CARLO SIMULATIONS

CROSS-REFERENCE TO RELATED APPLICATION

The present application is a continuation-in-part of the patent application Ser. No. 16/803,191 filed on Feb. 27, 2020. The Ser. No. 16/803,191 is a continuation patent application of the U.S. Ser. No. 16/458,132 filed on Jun. 30, 2019. The U.S. Ser. No. 16/458,132 application is also a continuation in part of the U.S. Ser. No. 14/032,467 application filed on Sep. 20, 2013, which further claims priority to a U.S. Provisional Application No. 61/826,324 filed on May 22, 2013, the entire contents of which are incorporated herein by references in its entirety.

BACKGROUND OF THE INVENTION

1. Field of the Invention

The present invention generally relates to a predicting an event; and more particularly relates to a method and a system for providing risk management by developing ratio scales measures for assessing and mitigating risks.

2. Description of the Related Art

Risk is the possibility of incurring a loss when an event takes place. Rather than referring to a risk, we instead, refer to an event and its likelihood, its impact, and its risk (the likelihood times the impact). Various methods are used to identify risk in events. One way is with a collaborative brainstorming involving participants at possibly geographically separated sites, using a whiteboard to enter events proposed for consideration (as practiced in Expert Choice Comparion).

Alternatively, and possibly used in conjunction, assets are identified and brainstorming is performed for each such asset to suggest events that might occur to diminish the value of the asset. Alternatively, and possibly used in conjunction, objectives (from an organizations objectives hierarchy as practiced in Expert Choice Desktop and Expert Choice Comparion) are considered to suggest events that might occur to diminish the achievement of each objective.

The identification, analysis, and treatment of risk occur in almost every facet of life including personal, business, and government. Whereas the focus of planning is to maximize the achievement of objectives, the focus of risk management is to minimize the expected loss or impact on objectives occurring from events that may or may not occur.

Risk Assessment consists of three parts—the evaluation and quantification of the impact of each event, the likelihood of each event, and the risk of each event. Evaluation and quantification of event impact is a necessary part of risk management. Further, it involves identifying risks, analyzing their likelihood of occurrence and impact on objectives, identifying controls that can reduce the likelihood of occurrence and/or impact on objectives, and allocating resources so as to minimize the expected losses.

Generally, the methods adopted for risk assessment techniques are ordinal measures for risk impact and likelihood, such as numbers 1 through 5. Some may even involve analytical hierarchal process. However, these methods are not accurate and were not giving optimized results. Therefore, there is a need of a system and a method to utilize the measurement of both the likelihoods and impacts of risk events with ratio scale measures. Furthermore, there is a need of the system to provide a monetary value of the impact of the of risk events on each of the objectives.

SUMMARY OF THE INVENTION

In accordance with the teachings of the present invention, a system for correcting inflated computed estimates of event loses derived from computed likelihoods and impacts of the events.

An object of the present invention is to provide the system includes a processor, an input unit, a display unit, a Monte Carlo simulation trials, and a data storage. The processor is configured to receive computed values of likelihood of causes via the input unit, further receiving computed values of likelihoods of the events given causes via the input, followed by a step of receiving consequence of the events on objectives via the input unit, receive computed value of the objectives, apply the Monte Carlo simulation trials on the causes, the events given the causes, and consequences of the events on the objectives; and compute the average loss to the objectives and the chance that the loss will exceed a pre-defined percentage.

Further the Monte Carlo simulation trial includes a step of generating a random cause number for each cause, wherein the cause occurs when the random cause number is less than or equal to the computed likelihood of the cause, followed by a step of generating a random event number for each event that has not yet occurred and has a cause that occurred to determine if the event has occurred; wherein the event occurs when the random event number is less than or equal to the computed likelihood for the event given the cause.

The step is then followed by a step of computing a simulated value for the consequences to each objective for each risk event, followed by a step of reducing the value of the objective by a percentage represented by the simulated value of the consequence of the event on the objective, followed by a step of repeating the step of reducing the value of the objective for each objective that has a consequence from the event to determine the total loss of each objective; and finally concluding with the step of determine the impact of the event by taking the sum product of the total loss to each objective and the computed value of the objectives.

Another object of the present invention is to provide the system with the Monte Carlo simulation trials to eliminate counting events to occur more than once to prevent inflated estimates of event loses.

Another object of the present invention is to provide the system in which the inflated event loses are computed by reducing the objective values from more than one event is corrected by reducing the value by an event's consequence to the remaining objective value after the value is reduced by other events in the Monte Carlo simulation trial.

Another objective of the present invention is to provide the processor with a step of compiling results of all Monte Carlo simulation trials to compute frequencies of loses. Further, the processor is configured to determine an average loss in the Monte Carlo simulation trials and the chance that the loss will exceed a pre-defined percentage.

These and other objects, features and advantages of the invention will become more fully apparent in the following detailed description, taken in conjunction with the accompanying drawings.

BRIEF DESCRIPTION OF DRAWINGS

FIG. 4C is a screenshot showing, by way of an Example, a Web Page for determining ratio scale results for the importance of objectives;

FIG. 4D is a screenshot showing, by way of an Example, a Web Page for selecting a method to use to evaluate the impact of the risk events on an objective;

FIG. 4F is a screenshot showing, by way of an Example, a Web Page for overall event impacts;

FIG. 4H(ii) indicates the priorities determined by 'All Participants' for the impact of one of the identified risk events with respect to the objective/consequence;

FIG. 4H(iii) indicates the priorities determined by 'All Participants' for one of the identified risk events with respect to the objective/consequence;

FIG. 6B is a screenshot showing, by way of an Example, a Web Page for showing various options of measurement type for measuring the risk events with respect to their likelihoods;

FIG. 6C is a screenshot showing, by way of Example, a Web Page for deriving ratio scale measures of the likelihood of causes by eliciting a pairwise verbal comparison;

FIG. 6E is a screenshot showing, by way of an Example, for a Web Page for rating the likelihood of the risk events given a cause using ratio scaled rating intensity priorities;

FIG. 9 illustrates a screenshot of showing importance of objectives in an exemplary embodiment;

DETAILED DESCRIPTION OF DRAWINGS

Figure 1:
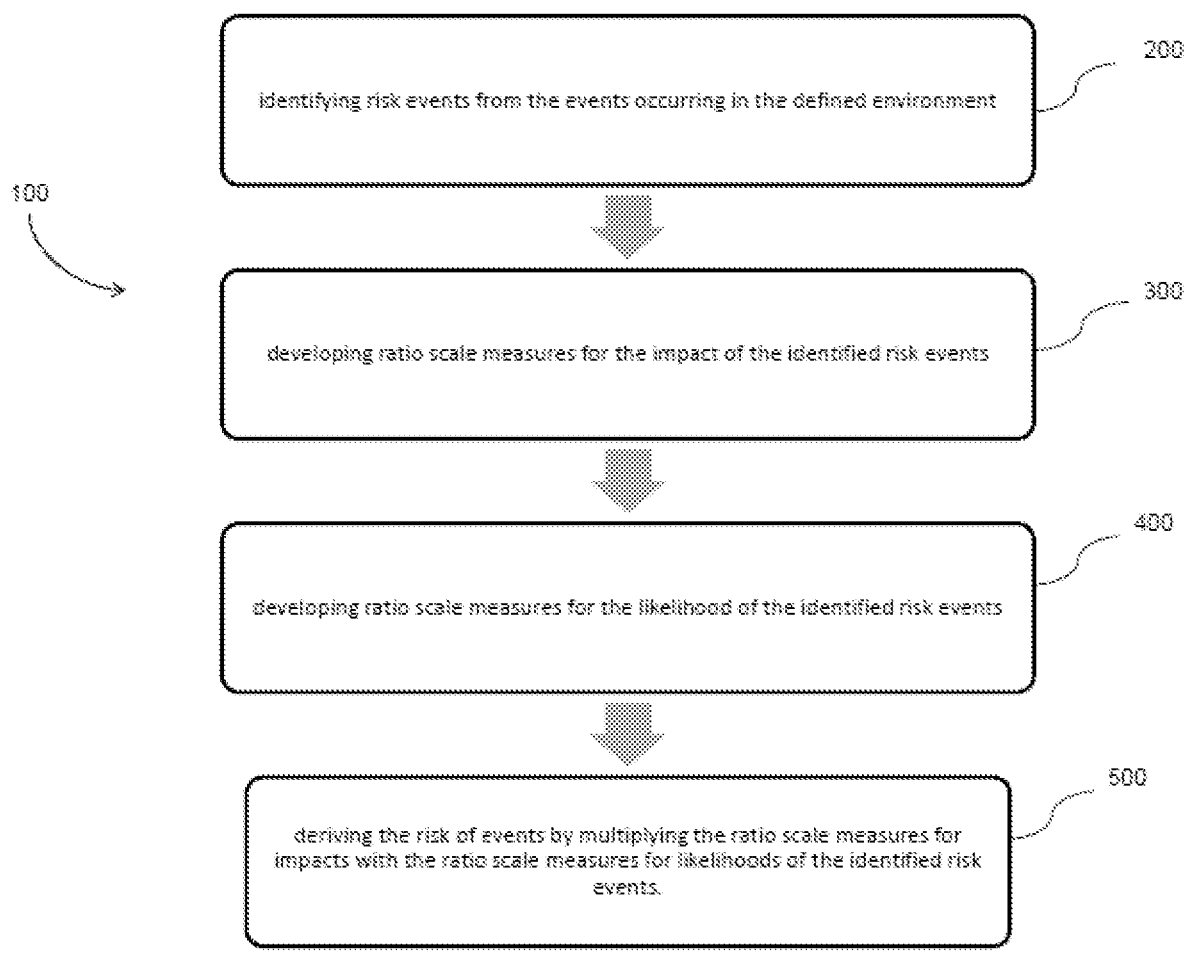
FIG. 1 illustrates a flowchart of a method for measuring and mitigating risk events in accordance with a preferred embodiment of the present invention.

While this technology is illustrated and described in a preferred embodiment, a system for correcting inflated estimates of event loses derived from computed likelihoods and impacts of the events may be produced in many different configurations, forms and computer language. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates a flowchart of a method 100 for measuring and mitigating risk events from the events occurring in a defined environment. The method 100 initiates with a step 200 to identify risk events from the events occurring in the defined environment. The risk events are identified by collaborative brainstorming involving participants at possibly separated geographical sites. The step 200 is explained in detailed in conjunction with FIG. 2A, FIG. 2B and FIG. 2C of the present invention.

The step 200 is then followed by a step 300 for developing ratio scale measures for the impact of the identified risk events. The identified risk events are associated with objectives and ratio scale measures are derived for the importance of the objectives as well as the impact of the events on the objectives. The development of the ratio scale measures for the impact of identified risk events are explained in detail in conjunction with FIG. 3, FIG. 4A to FIG. 4H(iii) of the present invention.

The step 300 is then followed by a step 400 for developing ratio scale measures for the likelihood of the identified risk events. The likelihoods of the identified risk events are measured for understanding the likelihood of the identified risk events in the defined environment. The development of the ratio scale measures for the likelihood of identified risk events are explained in detail in conjunction with FIG. 5 and FIG. 6A to FIG. 6E of the present invention.

The step 400 is then followed by a step 500 for deriving the risk of events by multiplying the ratio scale measures for impacts with the ratio scale measures for likelihoods of the identified risk events. The overall deriving of the risk events is explained in detail in conjunction with the granted parent patent of the present application.

Figures 2A, 2B:
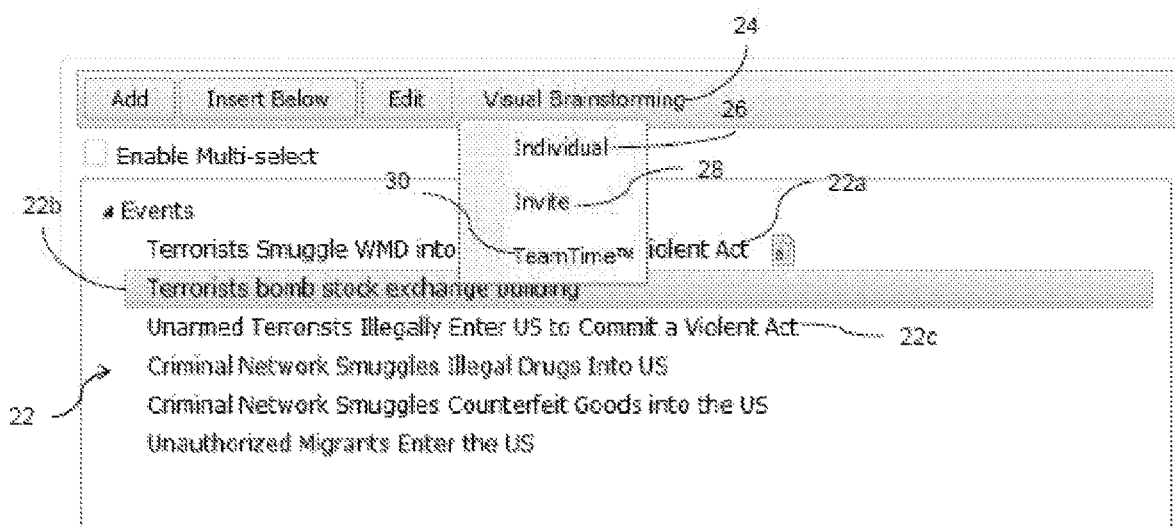
FIG. 2A is a screenshot showing, by way of an Example, a Web Page for showing identified risk events.
FIG. 2B is a screenshot showing, by way of an Example, a Web Page for inviting to a Team Time through an Invite.

FIG. 2a is a screenshot showing, by way of an Example, a Web Page for showing identified risk events 22. In an exemplary embodiment of the present invention, the examples of the identified risk events 22 are Terrorists Smuggle WMD 22a, Terrorists bomb stock exchange bonding 22b, Unarmed Terrorists Illegally Enter US to Commit a Violent Act 22c etc. The risk events 22 may be identified by various known methods such as brainstorming, surveys, interviews, working groups, experiential knowledge, documented knowledge, risk trigger questions, lessons learned, output from risk-oriented analysis, historical information and engineering templates.

In a preferred embodiment of the present invention, visual brainstorming 24 is used to identify the risk events 22. The visual brainstorming 24 is a process for developing creative solutions to problems on a visual platform. The visual brainstorming 24 may be done through Individually 26 or as a Team (Team Time) 30. Individuals are invited to a meeting beforehand 28. The Individual 26 allows visual brainstorming by a single person. The Invite 28 allows inviting of another person for visual brainstorming 24 to identify risk events 22. The Invite 28 is explained in detailed in conjunction with FIG. 2B of the present invention. The Team Time 30 provides a platform to a team for visual brainstorming 24. The Team Time 30 is explained in detail in conjunction with FIG. 2C of the present invention.

FIG. 2B is a screenshot showing, by way of an Example, a Web Page for inviting to a Team Time (explained through FIG. 2C) through Invite 28. The Invite 28 allows sending of a meeting request to another person to join Team Time (explained through FIG. 2C). In a preferred embodiment of the present invention, the Invite 28 include a meeting ID 30 for providing an identification code to another person to join as a team for brainstorming. In another preferred embodiment of the present invention, the Invite 28 may further include a meeting password 32 that allows setting of a password for brainstorming through the Team Time (explained in FIG. 2C)

Figure 2C:
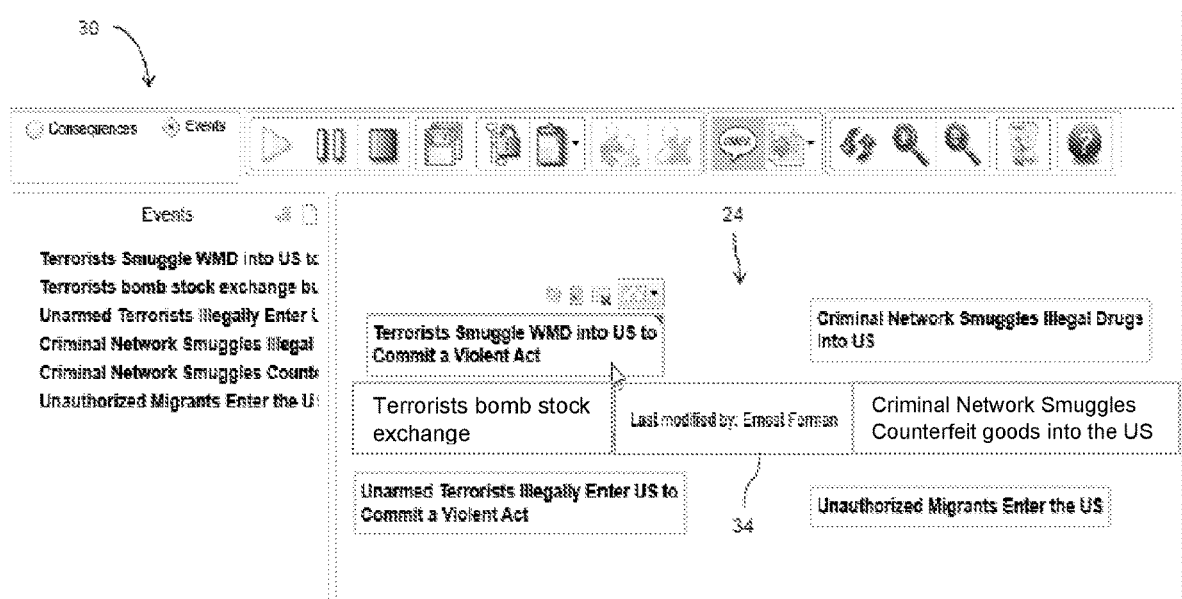
FIG. 2C is a screenshot showing, by way of an Example, a Web Page for showing Team Time for team brainstorming of risk events.

FIG. 2C is a screenshot showing, by way of an Example, a Web Page for showing Team Time 30 for team brainstorming. In an exemplary embodiment of the present invention, the visual brainstorming 24 is done by one or more persons. The Team Time 30 allows the invited person to do brainstorming on the events that could be possibly a risk event. The Team Time 30 shows a box 34 to show the name of the person who last modified the risk event.

Figure 3:
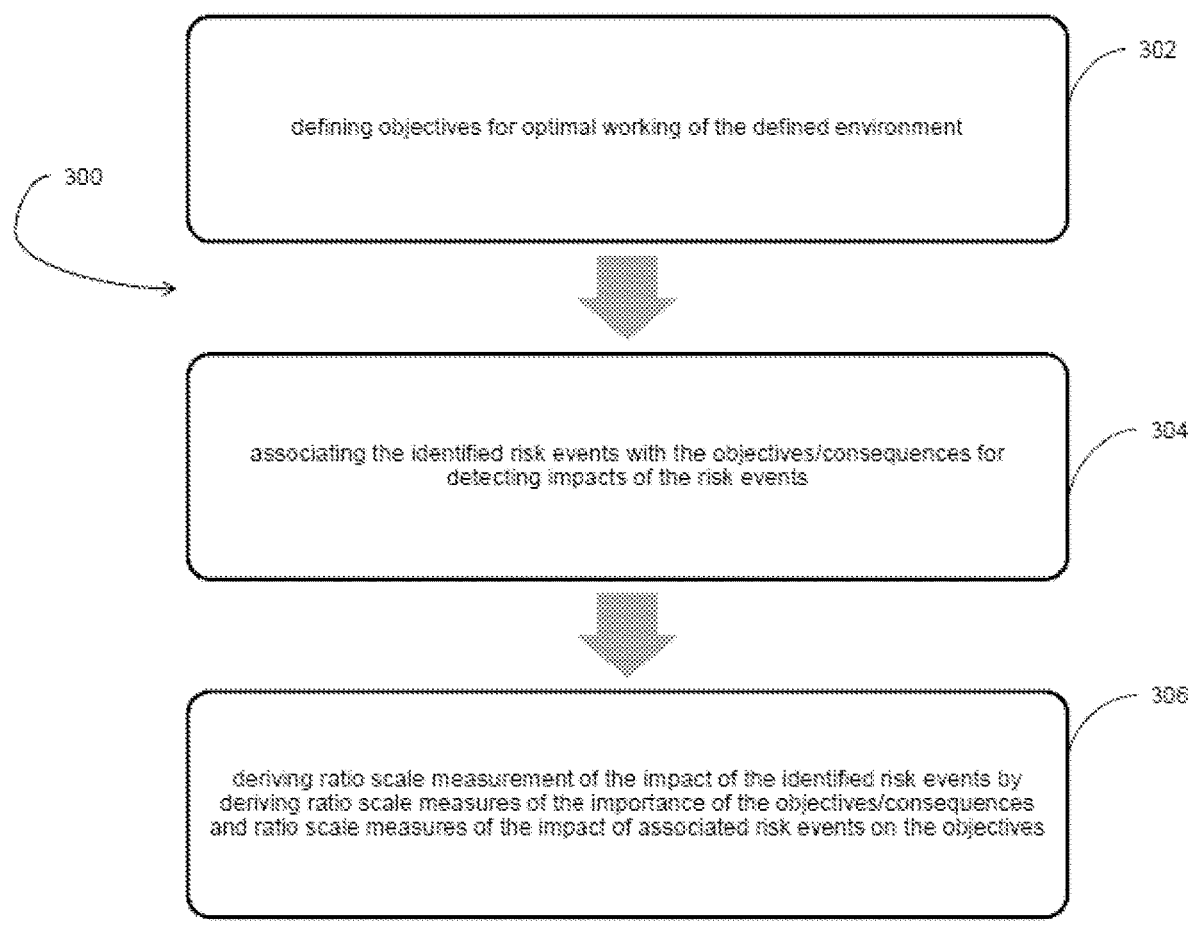
FIG. 3 illustrates a flowchart of a method for deriving the ratio scale measurement of the impacts of the identified risk events in accordance with a preferred embodiment of the present invention.

FIG. 3 illustrates a flowchart of a method 300 for deriving the ratio scale measurement of the impacts of the identified risk events in accordance with a preferred embodiment of the present invention. The method 300 initiates with a step 302 defining objectives/consequences for optimal working of the defined environment. The exemplary objectives for optimal working of the defined environment includes but not limited to loss of life, economic crises, loss of confidence etc.

The step 302 is then followed by a step 304 to associate the identified risk events with the defined objectives/consequences for detecting impacts of the identified risk events. An example of the association of the identified risk events with defined objectives is explained in FIG. 4A of the present invention. The step 304 is then followed by a step of 306 for deriving ratio scale measurement of the impact of the identified risk events by deriving the ratio scale measurement of the impacts of identified risk events by the sum-product of the ratio scale measures of the importance of the objectives and ratio scale measures of the impact of associated risk events on the objectives. The deriving of ratio scale measurement is explained in detail in conjunction with FIG. 4B to FIG. 4H(iii) of the present invention.

Figure 4A:
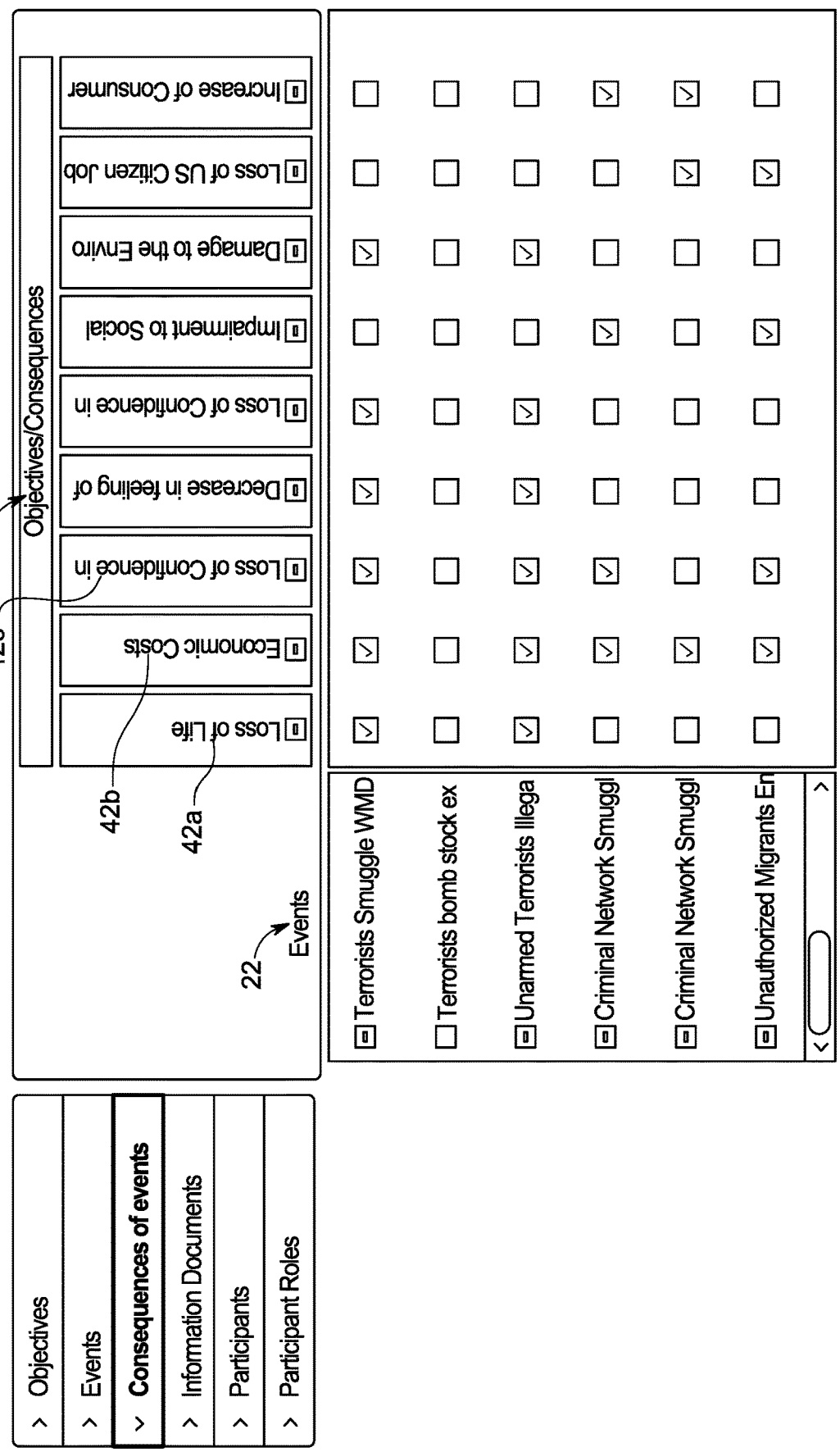
FIG. 4A is a screenshot showing, by way of an Example, a Web Page for associating the identified risk events with the defined objectives.

FIG. 4A is a screenshot showing, by way of an Example, a Web Page for associating the identified risk with the defined objectives/consequences 42. The identified risk events 22 are associated with the defined objectives 42 for detecting the impacts of the identified risk events 22. Examples of the defined objectives/consequences 42 include but not limited to Loss of Life 42a, Economic Costs 42b, Loss of confidence 42c etc. This association then helps in deriving ratio scale measurement and is explained through FIG. 4B to FIG. 4H(iii) of the present invention.

Figure 4B:
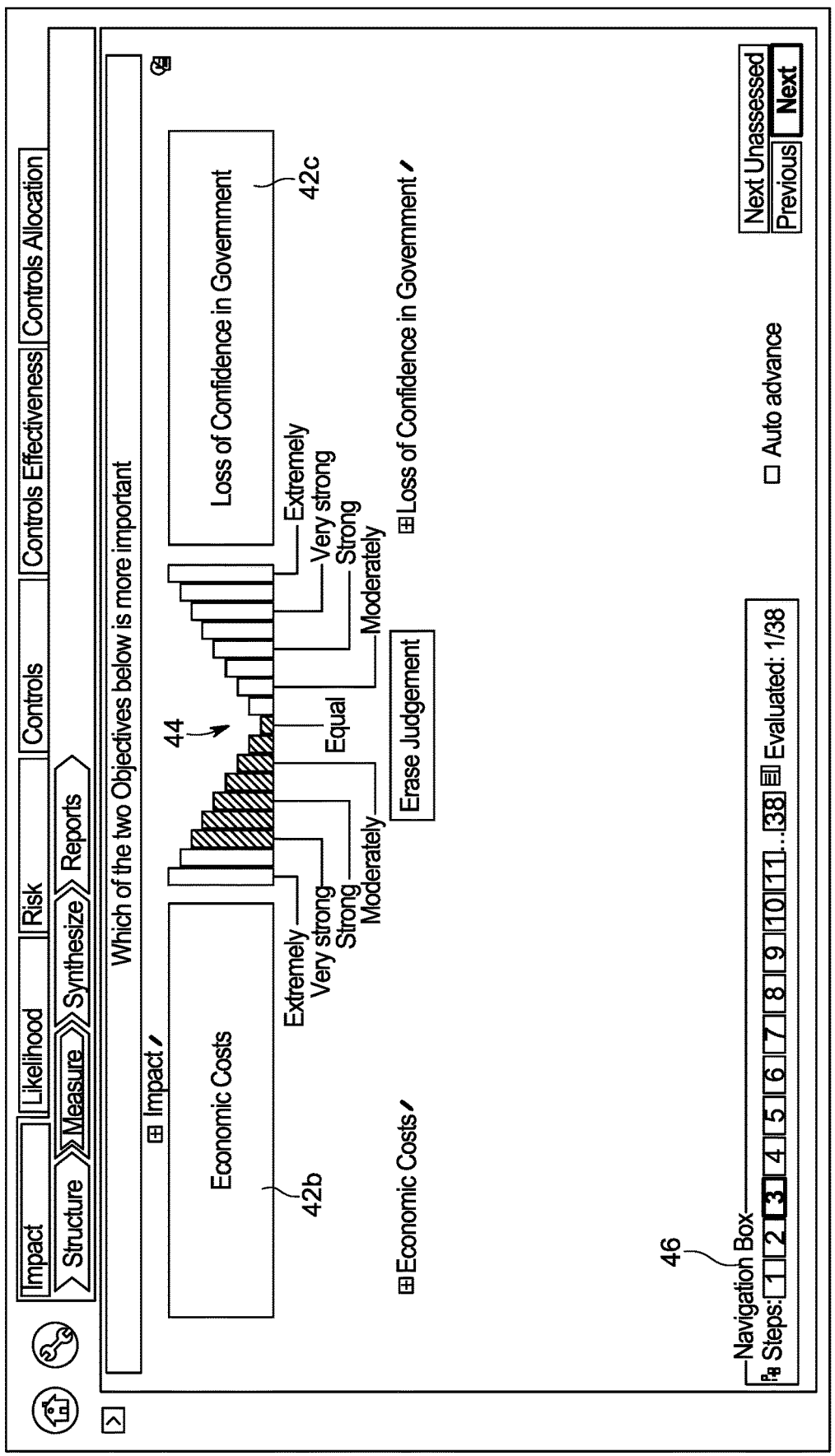
FIG. 4B is a screenshot showing, by way of an Example, a Web Page for deriving ratio scale measures of the importance of the objectives by eliciting pairwise verbal comparisons.

FIG. 4B is a screenshot showing, by way of an Example, a Web Page for deriving ratio scale measures of the importance of the objectives by eliciting pairwise verbal comparisons. In a preferred embodiment of the present invention, the relative importance of two objectives/consequences 42 such as Economic Costs 42b and Loss of Confidence in Government 42c in the defined environment is specified through a pairwise comparison 44. The pairwise comparison 44 is made to indicate which of the two objective/consequences 42 is more important and by how much. The pairwise comparison 44 is divided into verbal intensities of equal, moderately, strongly, very strongly and extremely or in between.

A series of pairwise comparisons between each objective/consequence in a cluster and all others in the cluster are performed. An eigenvector computation is performed and the priorities of the objectives/consequences determined by the normalized principle right hand eigenvector. In another exemplary embodiment, a navigation box 46 provides the ability to jump to different steps in the process.

FIG. 4C is a screenshot showing, by way of an Example, a Web Page for displaying the results for importance of objectives/consequences 42. The exemplary web page allows showing of the importance of losses (consequences to objectives) and provides an opportunity to change the priorities if they are not reasonable through the box 48.

FIG. 4D is a screenshot showing, by way of an Example, a Web Page for selecting a method to use to evaluate the impact of the risk events on an objective 42. In exemplary embodiment the objectives/consequences 42 may be measured through various options under measurement type 44 such as pairwise comparison, rating scale, simple utility curve, direct priority input and step function ascending.

Figure 4E:
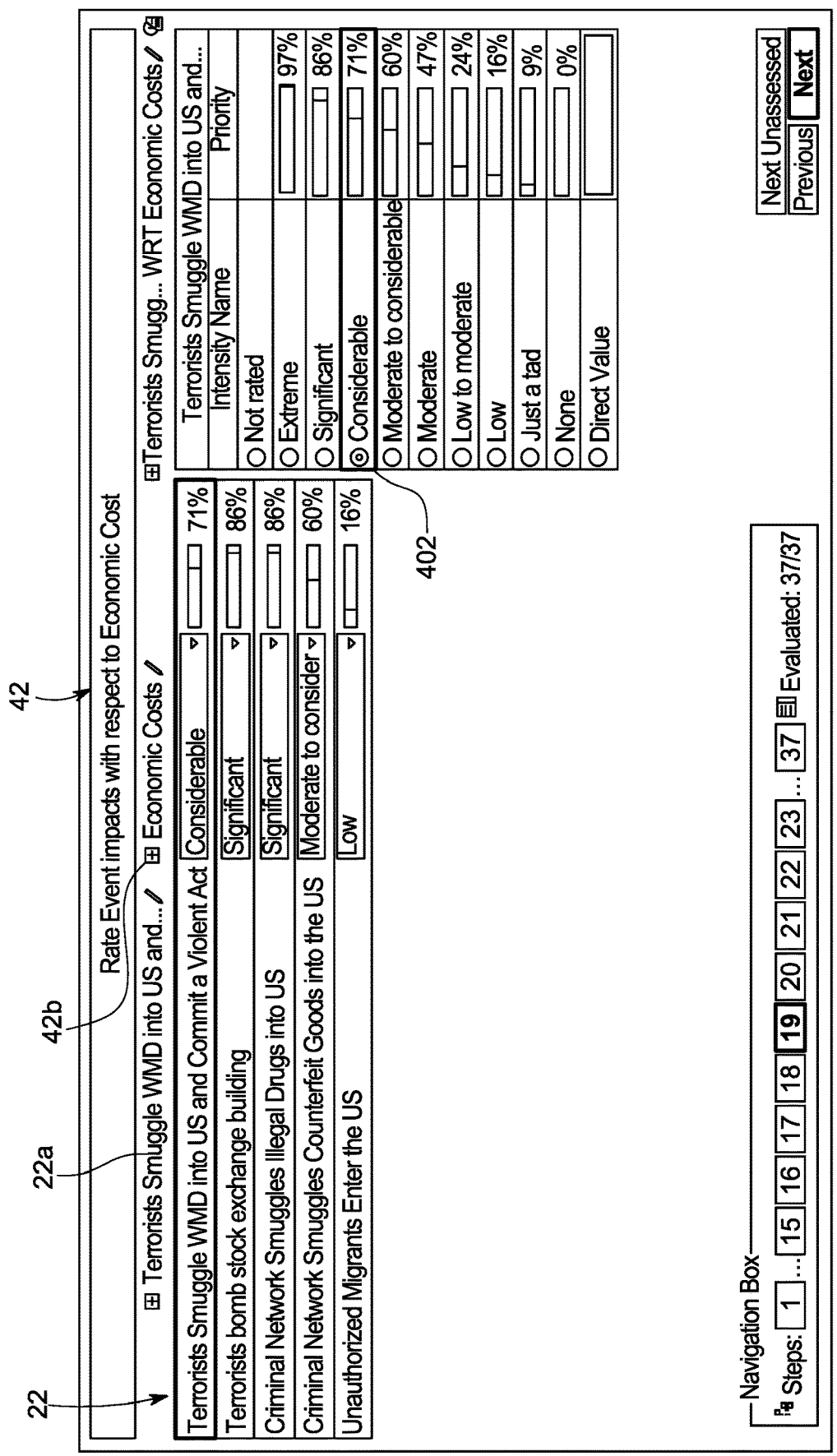
FIG. 4E is a screenshot showing, by way of an Example, a Web Page for rating the impact of the risk events on an objective using ratio scaled rating intensity priorities.

FIG. 4E is a screenshot showing, by way of an Example, a Web Page for rating the impact of the risk events 22 on one the objectives/consequences 42. Herein for the exemplary embodiment of the present invention, the risk events 22 are rated with respect to the objectives 42 such as Economic Cost 42b. In an exemplary embodiment, the rating of the risk event of Terrorist Smuggle WMD with respect to Economic cost 42a is Considerable at 71%.

In another exemplary embodiment, a table 402 shows the rating scale of Intensity Names and their ratio scale priorities. For example, the risk event 22 such as Terrorist Smuggle WMD . . . 22a with respect to Economic cost 42a is Considerable at 71%. Similarly, the impact of other risk events 22 such as Criminal Network Smuggles Illegal Drugs Into US is Significant i.e. 86%. The rating of each risk event 22 with respect to the each of the objectives/consequences 42 provides the ratio scale measurement of the impact of each risk events 22 in the predefined environment.

FIG. 4F is a screenshot showing, by way of an Example, a Web Page for showing overall risk event impacts. In the exemplary embodiment of the present invention, Impact 404 of each of the risk event 22 is provided. Further, the Navigation Box 406 allows navigation of pages to review and edit judgments. The impact of the risk events 22 is the sum-product of the impact of the risk events 22 on objectives/consequences 42 and the importance/priorities of the objectives 42. The sum-product for deriving impact of the risk event is explained in detail in conjunction with FIG. 4 h of the present invention.

Figure 4G:
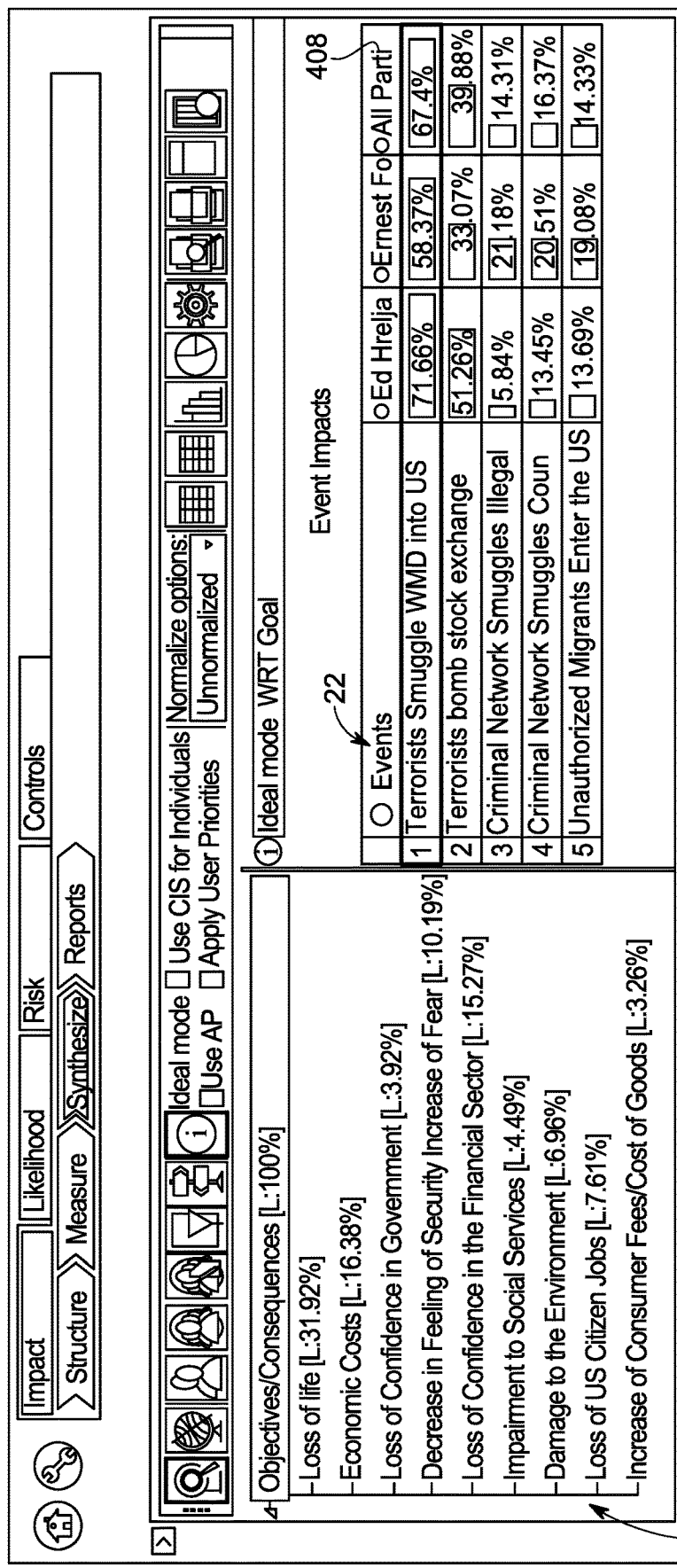
FIG. 4G is a screenshot showing, by way of another Example, a Web Page for overall event impacts in accordance with a preferred embodiment, here showing the results for two participants and for all participants.

FIG. 4G is a screenshot showing, by way of another Example, a Web Page for overall event impacts. The impacts of each risk event 22 are shown for all participants 408 with respect to consequences/objectives 42.

Figure 4H:
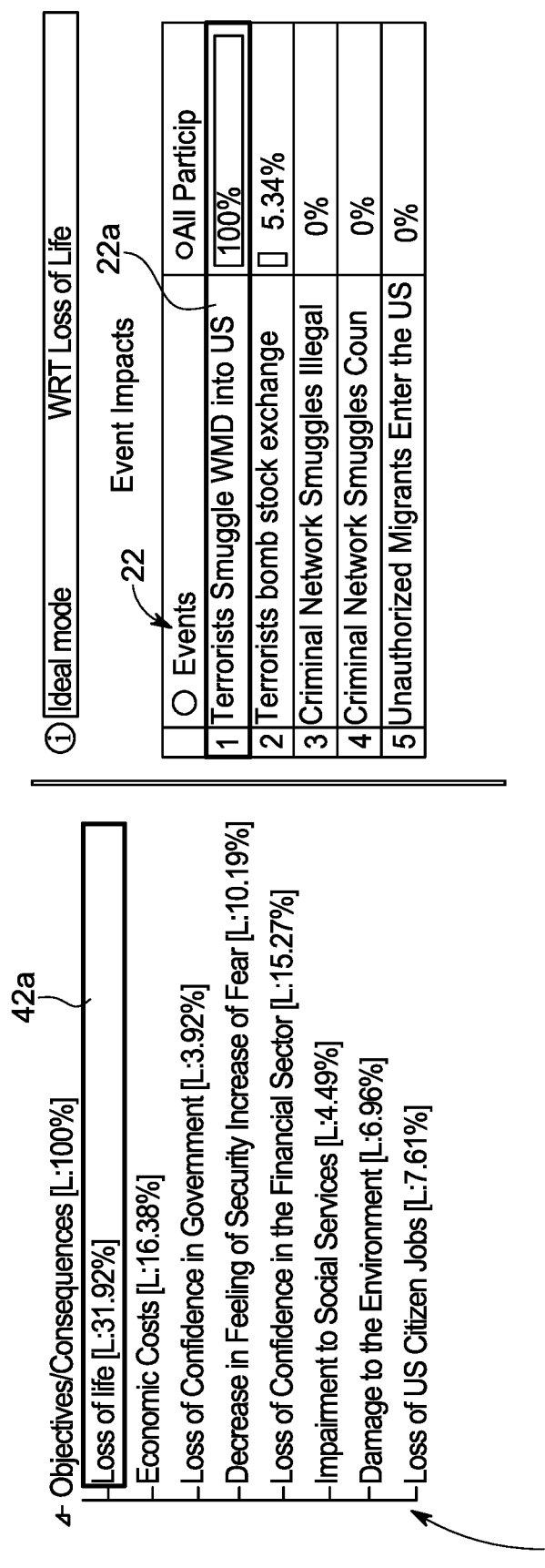
FIG. 4H(i) indicates the priorities determined by the 'All Participants' for the impact of one of the identified risk events with respect to the objective/consequence.

FIG. 4H(i) indicates the priorities determined by the 'All Participants' for the impact of one of the identified risk events 22a with respect to the objective/consequence 42a i.e. Loss of Life. For exemplary purposes, the priority determined by 'All Participants' for the identified event 22a 'Terrorist Smuggle WMD . . .' is 100% with respect to the objective/consequence 42a i.e. 'Loss of Life' which has a priority of 31.92%. The priorities of the impacts may be calculated by pairwise comparisons as described in FIG. 4B of the present invention.

FIG. 4H(ii) indicates the priorities determined by 'All Participants' for the impact of one of the identified risk events 22 with respect to the objective/consequence 42b i.e. Economic Costs. The impact of identified risk event 22a i.e. Terrorists Smuggle WMD . . . is 65.36% for the priority to objective/consequences 42b i.e. Economic Costs which has a priority of 16.38%. Similarly, FIG. 4H(iii) indicates the priorities determined by 'All Participants' for one of the identified risk events 22 with respect to the objective/consequence 42c i.e. Loss of Confidence in Govt. The impact of identified risk event 22a i.e. Terrorists Smuggle WMD . . . is 83.93% for the objective/consequences 42c i.e. Loss of Confidence in Govt. which has a priority of 3.92%.

Thus, for exemplary purposes the impact of the identified risk event 22 a i.e. Terrorists Smuggle WMD . . . is the sum-product i.e. SUM of 0.3192×1+0.1638×0.6536+ 0.1019×0.9179 . . . up to the 'n' number of objectives/consequences. For exemplary purposes, suppose the hypothetical value of impact of an identified risk event 22 a is 0.674021. This hypothetical value is used to calculate the risk of the identified event 'Terrorists Smuggle WMD 22a'.

Figure 5:
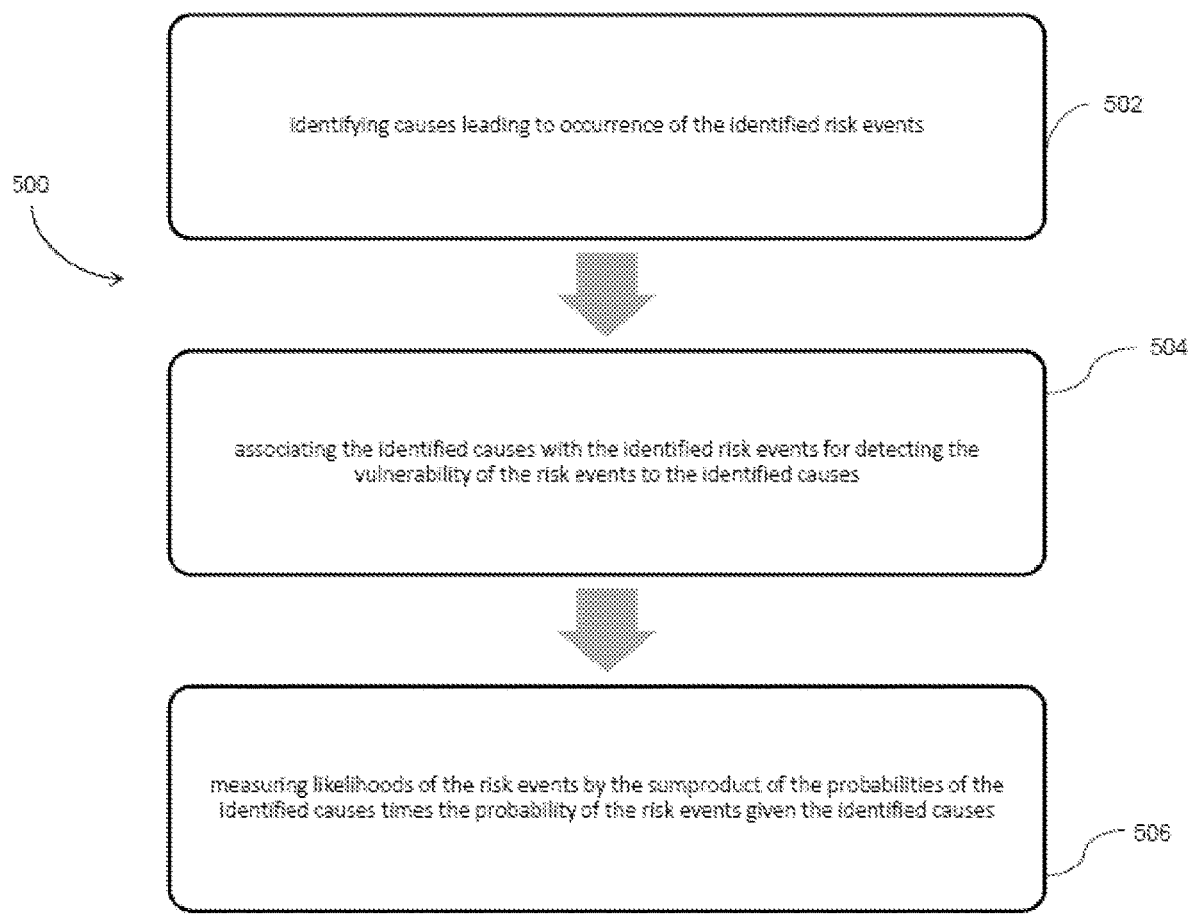
FIG. 5 illustrates a flowchart of a method for deriving the ratio scale measurement of the likelihoods of the identified risk events in accordance with a preferred embodiment of the present invention.

FIG. 5 illustrates a flowchart of a method 500 for deriving the ratio scale measurement of the likelihoods of the identified risk events in accordance with a preferred embodiment of the present invention. The method 500 includes a step 502 of identifying causes leading to occurrence of the identified risk events. In the exemplary embodiment, examples of the identified causes include but not limited to Strengthening of Terrorists cell, Lack of Intelligence Gathering and Sharing, Severe Funding Pressures etc. The step 502 is then followed by a step 504 for associating the identified causes with the identified risk events for detecting the vulnerability of the risk events to the identified causes. The association is explained in detail in conjunction with FIG. 6A of the present invention.

The step 504 is then followed by a step 506 for measuring likelihoods of the risk events by the sum-product of the probabilities of the identified causes times the probability of the risk events given the identified causes. Hereinafter in the specification, the term 'causes' and 'threats' are used interchangeably without deviating from the scope of the present invention. The measurement of likelihoods is explained in detail in conjunction with FIG. 6B to FIG. 6E of the present invention.

Figure 6A:
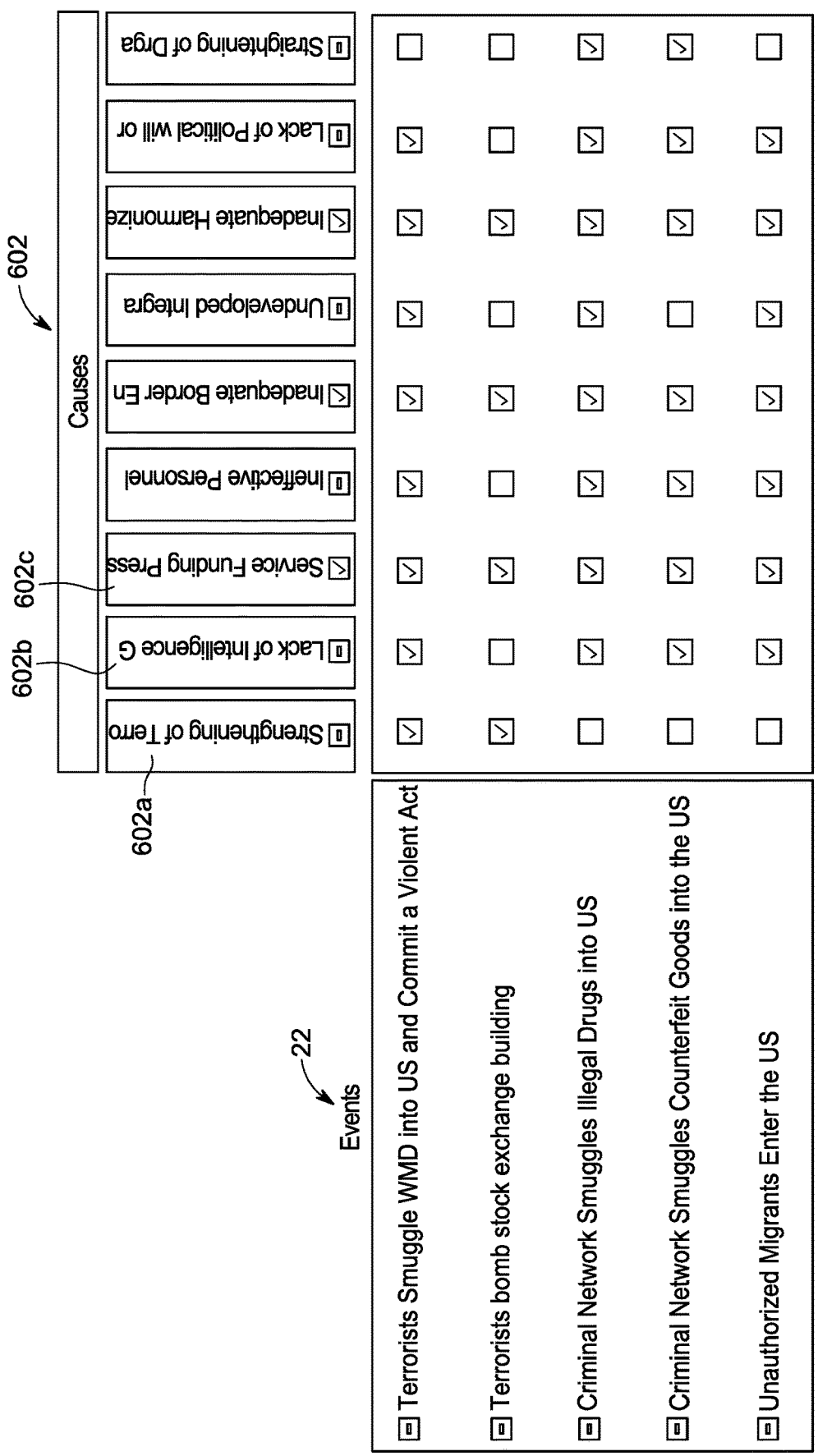
FIG. 6A is a screenshot showing, by way of another Example, a Web Page for associating the causes with the identified risk events.

FIG. 6A is a screenshot showing, by way of another Example, a Web Page for associating the identified causes 602 with the identified risk events 22. Examples of causes 602 include but not limited to Strengthening of Terrorists Cell . . . 602a, Lack of Intelligence . . . 602b, Server Funding . . . . The association is required to detect the vulnerability of the identified risk events 22 to the identified causes 602. The association then helps in measuring the likelihoods of the risk events which is explained in conjunction with FIG. 6B to FIG. 6E of the present invention.

FIG. 6B is a screenshot showing, by way of an Example, a Web Page for showing various options of measurement type 604 for measuring risk events with respect to their likelihoods. In the exemplary embodiment the causes 602 may be measured through various options under measurement type 604. Examples of options under measurement type 604 includes but not limited to such as pairwise comparison, rating scale, simple utility curve, direct priority input and step function ascending.

Figure 6C:
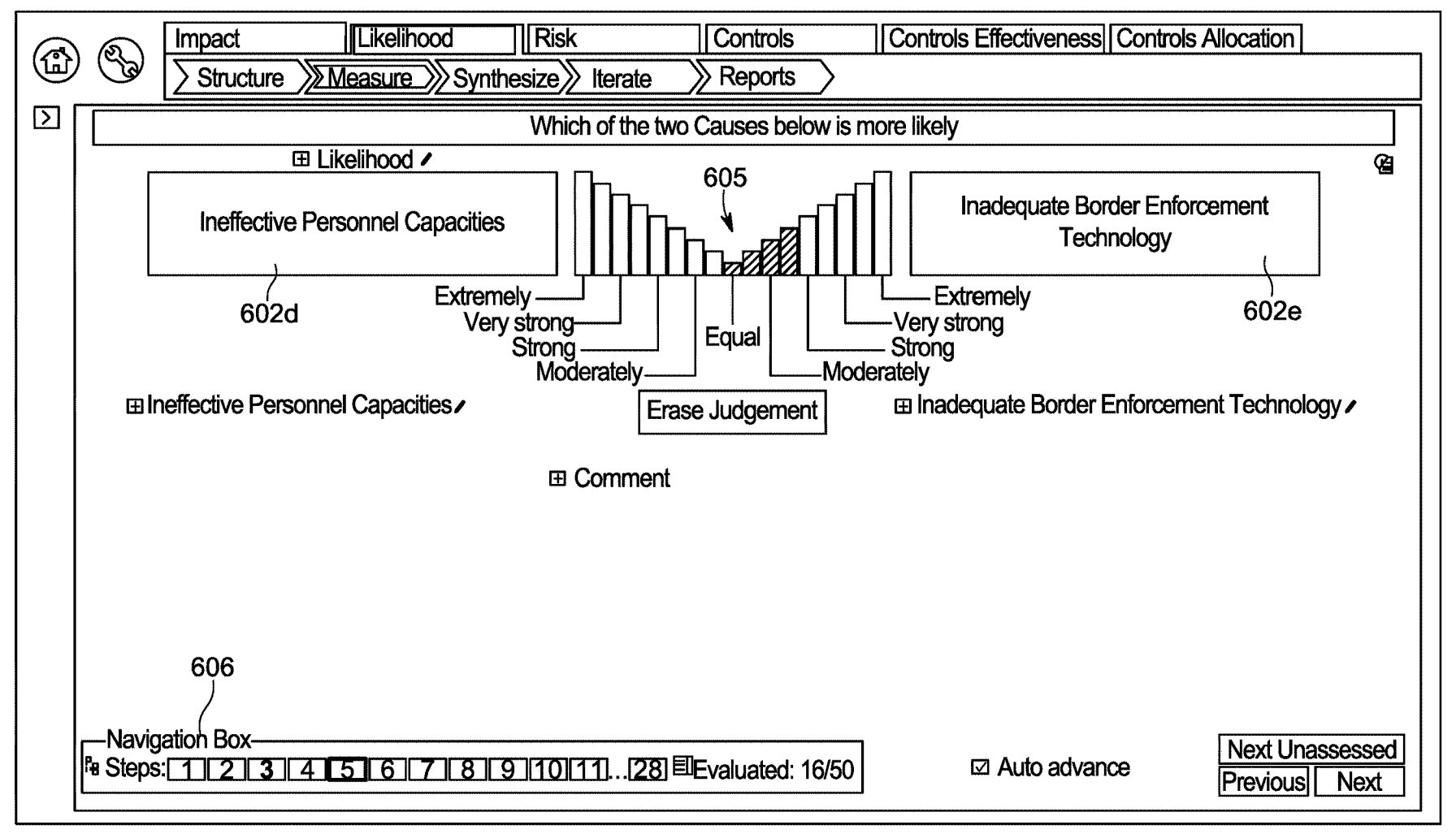

FIG. 6C is a screenshot showing, by way of Example, a Web Page for specifying the relative likelihood of two causes 602 such as Ineffective Personal Capabilities 602 d and Inadequate Border Enforcement Technology 602e. The pairwise comparison 605 is made to indicate which of the two causes 602 such as 602d and 602e is more likely to happen and by how much. The pairwise comparison 605 is divided into verbal intensities of Equal, Moderately, strongly, very strongly and extremely or in between. A series of pairwise comparisons 605 between each cause and all others is performed. An eigenvector computation is performed and the priorities of the causes determined by the normalized principle right hand eigenvector. In another exemplary embodiment, a navigation box 606 provides the ability to jump to different steps in the process.

Figure 6D:
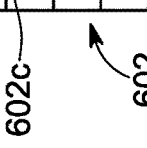
FIG. 6D is a screenshot showing, by way of an Example, a Web Page for showing the ratio scale results for the likelihood of the causes.

FIG. 6D is a screenshot showing, by way of an Example, a Web Page for showing the results for the likelihood of the causes 602. The Web Page displays the results after prioritizing the causes 602. As for the exemplary purposes, the highest priority of the causes 602 prioritized by All Participants is 33.21% is for the cause 602 i.e. severe funding pressures 602c. In another exemplary embodiment, a box 608 allows to change the priorities or the inconsistency that are not satisfactory.

FIG. 6E is a screenshot showing, by way of an Example, a Web Page for rating the likelihoods of risk events given a cause 602 such as Lack of Intelligence Gathering and Sharing 602b. Herein for exemplary purpose, the rating for the likelihood of the risk events 22a such as Terrorists smuggle WMD into US to commit a violent act for a given cause 602 such as lack of intelligence gathering and sharing 602b is Low or 26%. Similarly, for any another risk event 22 such as Criminal Network Smuggles Illegal Drugs Into US is moderately i.e. 47%. The rating of each risk event 22 for a given cause 602 provides ratio scale measurement of the likelihood of each risk event 22 in the predefined environment.

In another exemplary embodiment, a table 609 shows the rating of risk scale of Intensity Names and their ratio scale priorities. For example, for Terrorists smuggle WMD into US to commit a violent act for given lack of intelligence gathering and sharing 602c is Low or 26%.

Figure 7:
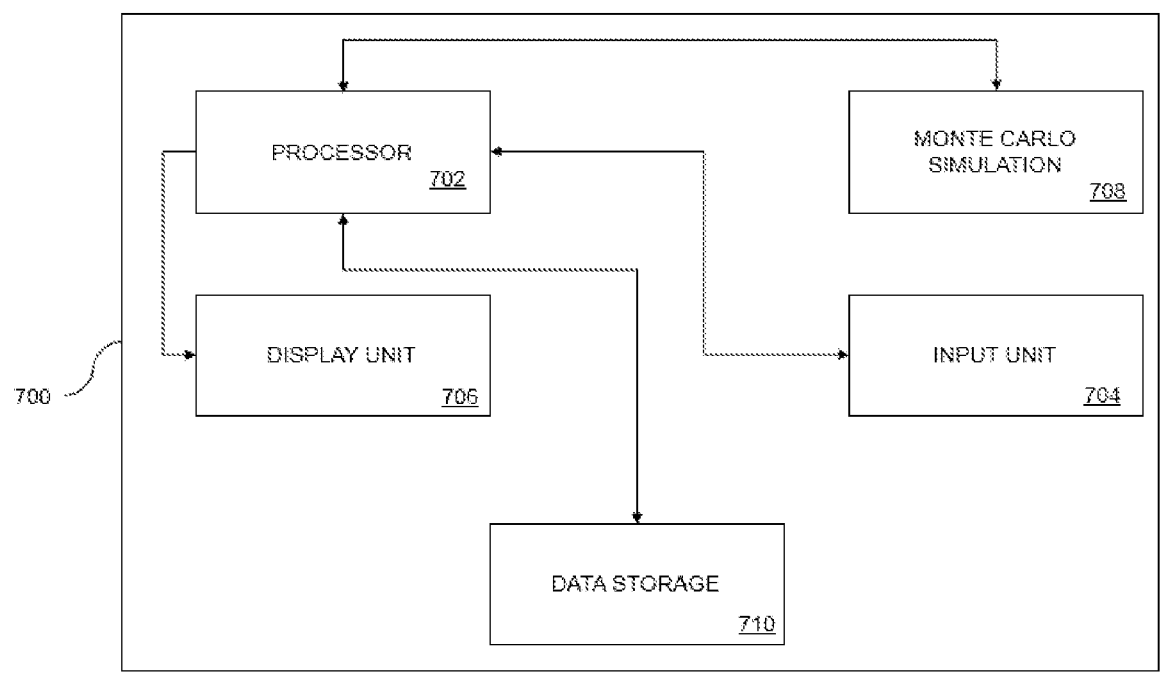
FIG. 7 illustrates a block diagram of a system for correcting inflated estimates of event loses derived from computed likelihoods and impacts of the events.

FIG. 7 illustrates a block diagram of a system 700 for correcting inflated estimates of event loses derived from computed likelihoods and impacts of the events. The system 700 includes a processor 702, an input unit 704, a display unit 706, a Monte Carlo simulation 708 and a data storage 710. The likelihoods and impacts of the events are computed and explained in detail in conjunction with FIG. 1 to FIG. 6 of the present inventions.

The processor 702 processes information. The input unit 704 is coupled to the processor 702 for receiving inputs from a user. The display unit 706 displays the processed information received from the processor 702. The Monte Carlo simulation 708 generates non-inflated estimates of risk events. The data storage 710 is coupled to the processor 702 for storing instructions.

The processor is configured to receive computed values of likelihood of causes via the input unit; and receive computed values of likelihoods of the risk events given causes via the input unit. The computed values of likelihood of causes and likelihood of risk events given causes are explained in detail in conjunction with FIGS. 6D and 6E.

Further, the processor is configured to receive consequence of the risk events on objectives via the input unit, followed by a step of receiving importance of the objectives via the input unit, followed by a step of applying the Monte Carlo simulation trials on causes, risk events given the causes, and consequences of the risk events on objectives.

Figure 8:
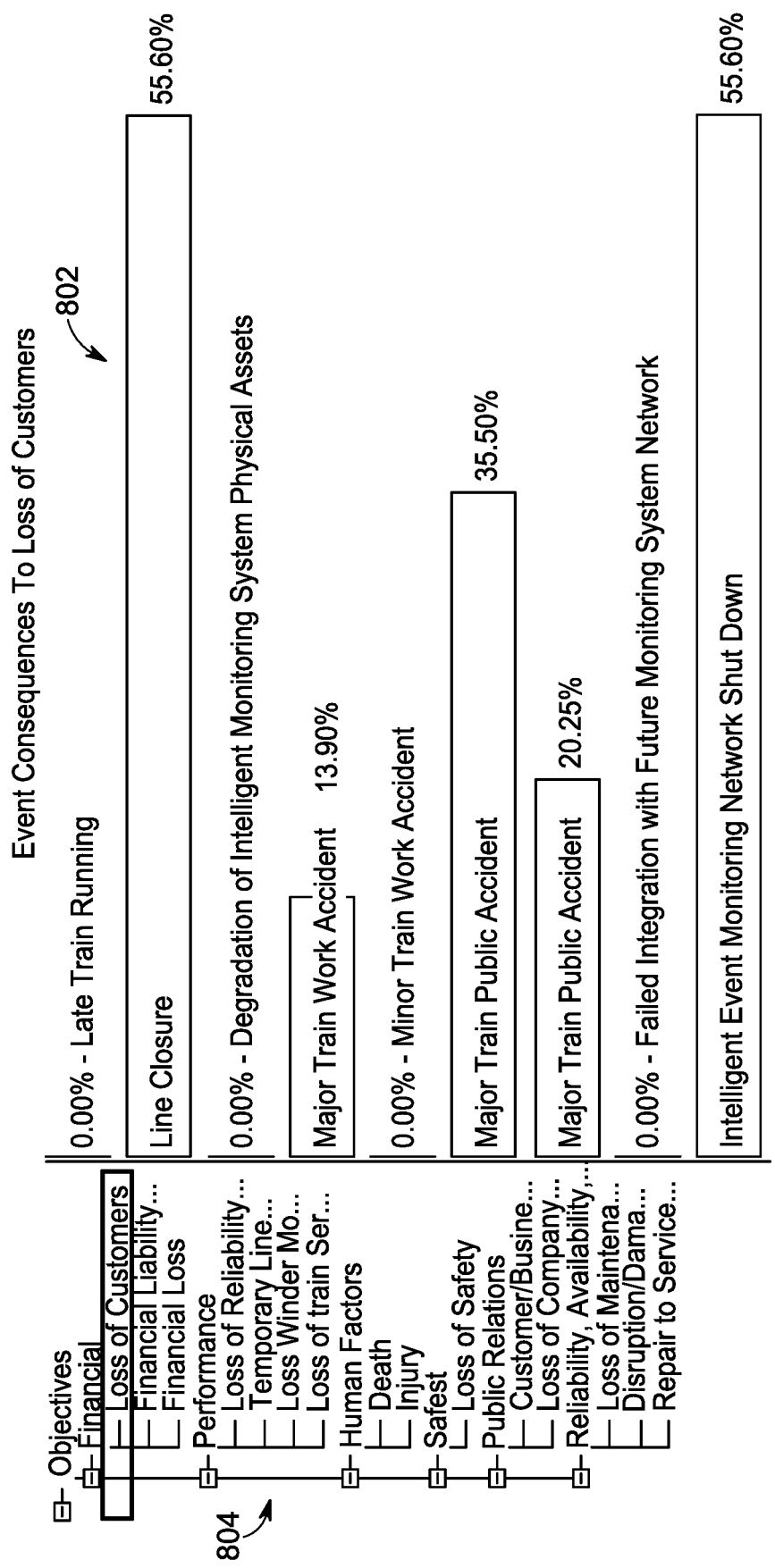
FIG. 8 illustrates a screenshot of showing consequence of the events on objective in an exemplary embodiment.

The step of receiving consequence of the risk events on objectives via the input unit and receiving importance of the objectives is explained in FIG. 8 and FIG. 9, respectively. The Monte Carlo Simulation trial initiates with a step of generating a random cause number for each cause, wherein the cause occurs when the random cause number is less than or equal to the computed likelihood of the cause, followed by a step of generating a random event number for each event that has not yet occurred and has a cause that occurred to determine if the event has occurred.

The event occurs when the random event number is less than or equal to the computed likelihood for the event given the cause. The above step is followed by a step of computing a simulated value for the consequences to each objective for each risk event, followed by a step of reducing the value of the objective by a percentage represented by the simulated value of the consequence of the event on the objective.

Further, the step is followed by a step of repeating the step of reducing the value of the objective for each objective that has a consequence from the event to determine the total loss of each objective, and followed by a step to determine the impact of the event by taking the sum product of the total loss to each objective and the computed value of the objectives. The Monte Carlo simulation is explained in detail in conjunction with FIG. 10 and FIG. 11 of the present invention.

FIG. 8 illustrates a screenshot of showing consequence of the events 802 on 'objective' 804 in an exemplary embodiment. Here, the consequence of risk events 802 is shown on one objective i.e., on the 'Loss of Customers'. The consequence of the risk events on the objectives are received via synthesis of judgments using analytical hierarchal process (AHP).

As shown, the consequence of the risk events 802 on the objective 'Loss of Customers'—are as: 'Line Closure' is 55.60%, 'Major Train Work Accident' is 13.90%, 'Major Train Public Accident' is 35.50%, 'Minor Train Public Accident' is 20.25% and so on. It would be known to skilled in the art that one need to compute consequence of risk events on each objective to determining overall risk for each risk event.

In a preferred embodiment, the consequence of the risk events is evaluated for the lowest levels of the objective hierarchy. The consequences are known to affect the lowest level of objectives and thus the present system evaluates the lowest level of objectives to compute the consequence of risk events. For exemplary purposes as shown in FIG. 8, the 'Loss of Customers' objective is a low-level objective of the 'Financial' objective.

FIG. 9 illustrates a screenshot 900 of showing importance of objectives, in an exemplary embodiment. The 'importance of objectives' 902 is received by using pair wise comparisons. The 'importance of objectives' is computed to know the risk of risk events. The risk is expected loss to objectives, and thus it is necessary to know the importance of objectives.

As shown, the pairwise comparison is used to compute the importance of objectives. For exemplary purposes, the importance of 'Financial objective' is 7.22%, 'Reliability, Availability, Maintainability' is 21.70% and so on. The pairwise comparisons are explained in detailed in the parent application of the present continuation-in-part application.

For exemplary purposes as shown in the FIG. 9, the importance of upper level of 'objective' 804 hierarchy is shown to compute the importance of objectives. However, the system computes the importance of each objective in the hierarchy because the risk depends on the importance of the lowest level objectives, which in turn, depend on the importance of their parent objectives, which helps the system to evaluate the overall consequence of each risk event on each objective in the hierarchy.

It would be readily apparent to those skilled in the art that various methods may be used to evaluate the importance of objective such as ratings, utility curves, direct input etc. without deviating from the scope of the present invention.

Figure 10:
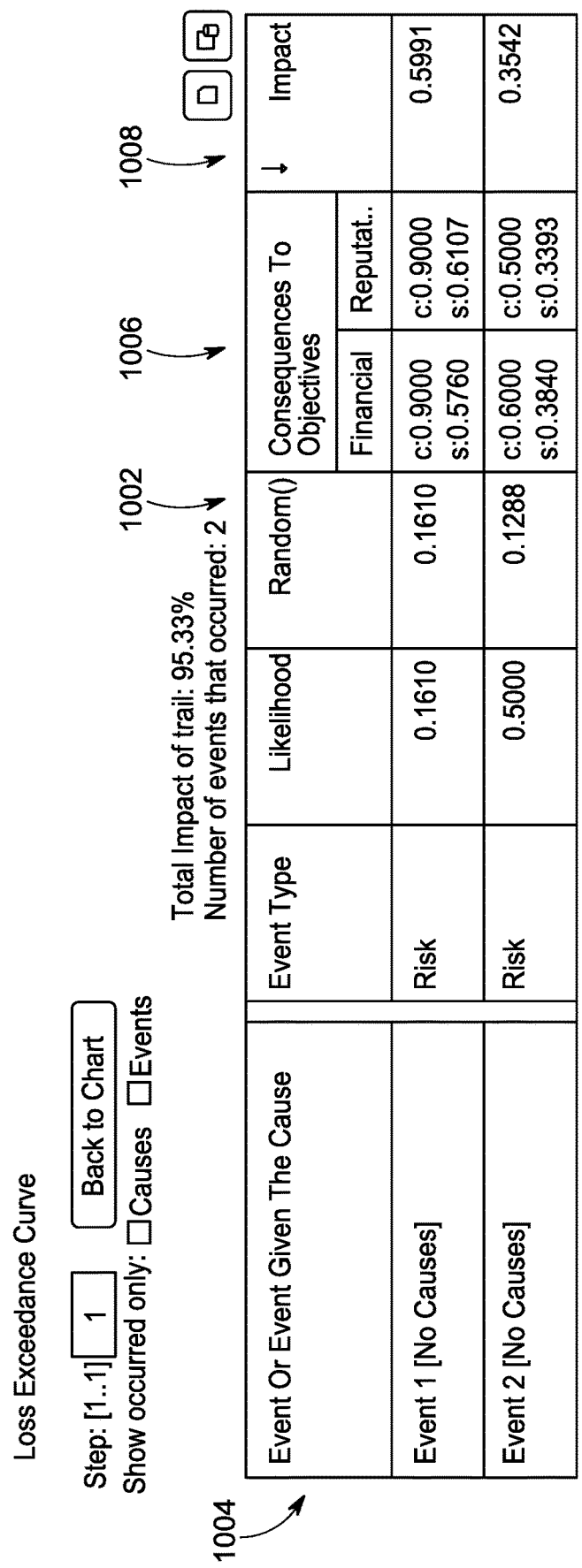
FIG. 10 illustrates a screenshot of a Monte Carlo Simulation trial of the consequences of events to the objectives.

FIG. 10 illustrates a screenshot of a 'Monte Carlo Simulation trial' 1000 of the consequences of events to the objectives. The 'Monte Carlo simulation trial' 1000 generates a 'random event number' 1002 for each event 1004 that has not yet occurred and has a cause that occurred to determine if the event has occurred. The event occurs when the 'random event number' 1002 is less than or equal to the computed likelihood for the risk event given the cause.

For exemplary purposes as shown in FIG. 10, the 'random event number' 1002 for Event 1 is 0.1610, and for Event 2 is 0.1288. Further, the computed likelihood of Event 1 is 0.6140 and for Event 2 is 0.5000. Further, the computed values of the 'consequence of events to objectives' 1006 for Event 1 against Financial objective is 0.9000, and for Event 2 against Financial objective is 0.6000.

The event occurs when the random event number for Event 1 is less than or equal to the computed likelihood for the event 1 given the cause. Herein for exemplary purposes, the random event number for Event 1 is 0.1610 and computed likelihood for the event 1 is 0.9000. The random event number for Event 1 is less than the computed likelihood for the event 1.

In another exemplary embodiment, the simulated value of the consequences to the 'financial objective' for the risk event 1 is 0.5760, and for risk event 2 is 0.3840. The Monte Carlo simulation further reduces the value of the objective by a percentage represented by the simulated value of the consequence of the event on the objective. The reducing of the value of the objective is explained in detail in conjunction with FIG. 12 of the present invention.

Further, the Monte Carlo simulation trial repeats the step of reducing the value of the objective for each objective that has a consequence from the event to determine the total loss of each objective, followed by the step of determining the impact of the event by taking the sum product of the total loss to each objective and the value of the objectives.

Further in another exemplary embodiment as shown in the FIG. 10, the impact 1008 of the event is computed by taking the sum product of the total loss to each objective and the computed value of objectives. Hence, the impact of Event 1 is 0.5991 and for Event 2 is 0.3542. The computed values of the objectives are calculated using pair wise comparison and is explained in detail in conjunction with FIG. 9 of the present invention.

In exemplary embodiment, the computed consequences for each occurring event to 'Financial' objective: 0.9000 for 'Event 1' and 0.6000 for 'Event 2'. The simulated value to the consequence of Event 1 to 'Financial' objective is computed using the following formula:

$$(1 - (1 - .9000) * (1 - .6000)) * (.9000/(.9000 + .6000)) = .5760$$

Where, (1−0.9000)*(1−0.6000) is the remainder of the 'Financial' objective after considering the consequences of each of the events that occurred.
1−remainder=(1−(1−0.9000)*(1−0.6000)) is the total consequence to the 'Financial' objective.
(0.9000/(0.9000+0.6000) is normalizing for consequence of the event divided by the total consequences of all occurring events.

Figure 11:
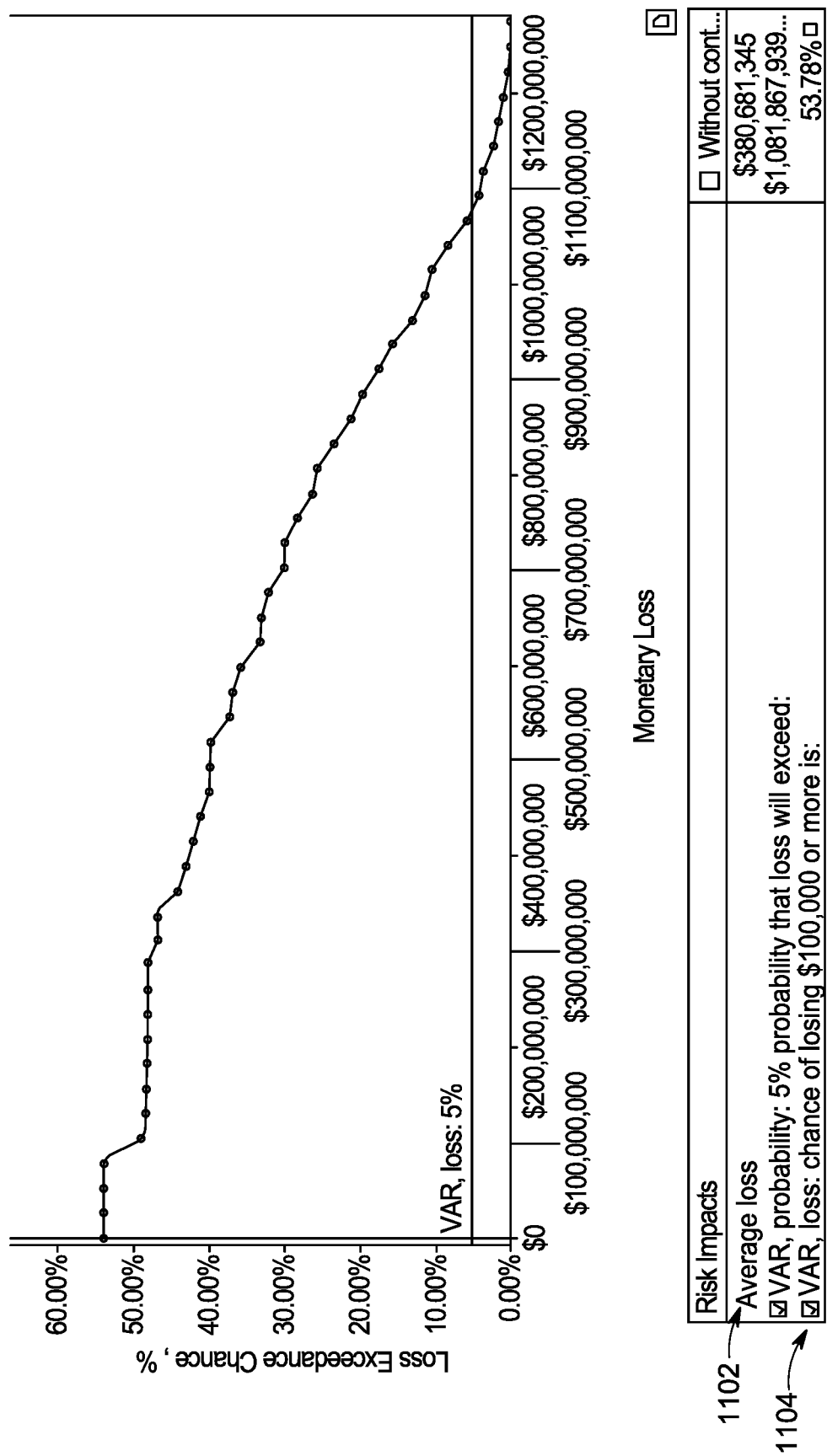
FIG. 11 illustrates a graphical presentation of a Loss Exceedance Curve in an exemplary embodiment.

FIG. 11 illustrates a graphical presentation of a Loss Exceedance Curve in an exemplary embodiment. The Loss exceedance curve graph represents complementary cumulative distribution of the frequencies of loses for the simulation trial. The processing unit determines an average loss in the Monte Carlo simulation trials and the chance that the loss will exceed a pre-defined percentage.

For exemplary purposes as shown in FIG. 11, The graph showcase distribution of frequencies of loses against the monetary loss. The 'average loss' 1102 is 380,681,345. Further, the 'chance of losing' 1104 is more than $100,000 is 53%. Similarly, the chance of losing more than $500,000 is 45%, and losing more than $1.1M is 5%.

Examples of the system 700 includes but not limited to a tablet pc, a laptop, a mobile phone using a Windows, DOS, Macintosh, UNIX or other operating system equipped with a standard web-browser application and capable of connecting to the Internet.

The present invention should not be limited in its communication nomenclature. Exemplary operating systems include but are not limited to SymbianOS, Windows Mobile/Windows CE, Palm OS, Linux, Blackberry OS, BREW, webOS, Android, iOS, etc. which have been developed for mobile computing applications and can handle both data computing and communication applications, e.g., voice communications.

Examples of the processor 702 includes but not limited to one or more special-purpose processing devices such as an application specific integrated circuit (ASIC), a field programmable gate array (FPGA), a digital signal processor (DSP), network processor etc. The processor 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets.

The present invention offers various advantages in order to more accurately determine the risk and chance of exceedance a specified loss for any system or situation, where risk is of concern and where controls can be employed to reduce risks to tolerable levels, constrained by the availability of resources.

The foregoing discussion discloses and describes merely exemplary embodiments of the present invention. One skilled in the art will readily recognize from such discussion and from the accompanying drawings that various changes, modifications and variations can be made therein without departing from the spirit and scope of the invention.

The invention claimed is:

1. A system for correcting inflated computed estimates of risk event loses derived from computed likelihood and impacts of the risk events, the system comprising:
   a processor for processing information;
   an input unit coupled to the processor for receiving inputs from a user;
   a display unit to display processed information received from the processor;
   a Monte Carlo simulation trials to generate non-inflated estimates of risk event loses; and
   a data storage coupled to the processor for storing instructions,
   wherein the processor configured to:
   receive computed values of likelihood of causes via the input unit;
   receive computed values of likelihood of the risk events given causes via the input unit;
   receive consequence of the risk events on objectives via the input unit;
   receive computed value of the objectives via the input unit;
   apply the Monte Carlo simulation trials on the causes, the risk events given the causes, and consequences of the events on the objectives;
   compute the average loss to the objectives and the chance that the loss will exceed a pre-defined percentage;
   wherein each Monte Carlo Simulation trial comprising of:
   generating a random cause number for each cause, wherein the cause occurs when the random cause number is less than or equal to the computed likelihood of the cause;
   generating a random event number for each risk event that has not yet occurred and has a cause that occurred to determine if the risk event has occurred;
   wherein the risk event occurs when the random event number is less than or equal to the computed likelihood for the risk event given the cause;
   computing a simulated value for the consequences to each objective for each risk event;
   reducing the value of the objective by a percentage represented by the simulated value of the consequence of the risk event on the objective;
   repeating the step of reducing the value of the objective for each objective that has a consequence from the risk event to determine the total loss of each objective;
   determine the impact of the risk event by taking the sum product of the total loss to each objective and the computed value of the objectives;
   and
   display the impact of the event on the display unit.

2. The system according to claim 1, wherein the Monte Carlo simulation trials eliminate counting risk events to occur more than once to prevent inflated estimates of risk event loses.

3. The system according to claim 1, wherein the inflated event loses computed by reducing the objective values from more than one risk event is corrected by reducing the value by an event's consequence to the remaining objective value after the value is reduced by other risk events in the Monte Carlo simulation trial.

4. The system according to claim 1, wherein the processor is further configured to compile the results of all Monte Carlo simulation trials to compute frequencies of loses.

5. The system according to claim 1, wherein the processor is further configured to determine an average loss in the Monte Carlo simulation trials and the chance that the loss will exceed a pre-defined percentage.

6. The system according to claim 4, wherein the processor is further configured to display on the display unit the frequencies of loses in a complementary cumulative distribution of results via a Loss Exceedance Curve.

\* \* \* \* \*